United States Patent [19]

Yamashita

[11] Patent Number: 4,879,620
[45] Date of Patent: Nov. 7, 1989

[54] MAGNETIC HEAD FOR FLEXIBLE DISK DRIVE

[75] Inventor: Akihiko Yamashita, Koide, Japan

[73] Assignee: Alps Electric Co., Ltd., Japan

[21] Appl. No.: 149,634

[22] Filed: Jan. 28, 1988

[30] Foreign Application Priority Data

May 26, 1987 [JP] Japan .............................. 62-79598[U]

[51] Int. Cl.[4] ............................ G11B 5/20; G11B 5/27
[52] U.S. Cl. .................................. 360/123; 360/104; 360/121
[58] Field of Search ................................ 360/104-105, 360/129, 123, 125, 121

[56] References Cited

U.S. PATENT DOCUMENTS

| | | | |
|---|---|---|---|
| 4,118,747 | 10/1978 | Hanaoka et al. | 360/123 X |
| 4,382,269 | 5/1983 | Kato | 360/121 |
| 4,432,027 | 2/1984 | Higuchi | 360/104 |
| 4,514,776 | 4/1985 | Kuyama et al. | 360/121 |
| 4,538,191 | 8/1985 | Suzuki et al. | 360/104 X |
| 4,633,352 | 12/1986 | Mizoguchi et al. | 360/104 |
| 4,658,315 | 4/1987 | Seki et al. | 360/105 X |
| 4,710,833 | 12/1987 | Hasegawa | 360/105 |
| 4,788,613 | 11/1988 | Yamashita | 360/123 |

Primary Examiner—John H. Wolff
Attorney, Agent, or Firm—Guy W. Shoup; Paul J. Winters

[57] ABSTRACT

A magnetic head for a flexible disk which prevents lead wires from being cut or damaged by contact thereof with an edge of a fitting window of a gimbal spring when they are to be led out and facilitates such a drawing operation and a connecting operation of lead wires. The magnetic head comprises a coil bobbin having a terminal locating table formed on a flange thereof which is located at an end of a coil bobbin adjacent a support plate. A number of terminals corresponding to lead wires of a coil wound on the coil bobbin are provided uprightly on the terminal locating table, and ends of the lead wires are secured to the corresponding terminals. The terminals extend upwardly through and above the support plate and are connected to a printed circuit board mounted on the support plate.

5 Claims, 5 Drawing Sheets

MAGNETIC HEAD FOR FLEXIBLE DISK DRIVE

BACKGROUND OF THE INVENTION

This invention relates to a magnetic head for a flexible disk.

An exemplary one of conventional magnetic heads for a flexible disk is shown in FIGS. 8 and 9. The magnetic head shown in FIGS. 8 and 9 includes a recording and playback side magnetic core 12 consisting of a pair of half cores 12a and 12b and incorporated in a slider 11, and an erasing core 13 also incorporated in the slider 11. A channel-shaped erasing yoke 15 is accommodated and secured in a recess 14 of the slider 11 with a pair of opposing inner faces thereof contacted with opposite end faces of the erasing core 13, and an erasing coil 16 is wound around the erasing yoke 15. A coil bobbin 18 is mounted on the half core 12a of the recording and playback side magnetic core 12 and has a coil 17 wound thereon. A magnetic head assembly is constituted in this manner. A support plate 20 for securing the magnetic head assembly of the construction described above has a pair of fitting windows 21 formed therein in which the half cores 12 and 12b are fitted.

The slider 11 of the magnetic head assembly is secured to a mounting face of the support plate 20 by a suitable means such as a synthetic resin or a bonding agent with the half cores 12a and 12b of the magnetic head assembly fitted in the fitting windows 21 of the support plate 20 and projected upwardly from an upper face of the support plate 20, and a back core 22 is secured by a spring clip, a bonding agent or the like to and extends between top ends of the half cores 12a and 12b, thereby completing the magnetic head for a flexible disk.

By the way, the conventional magnetic head described above has such a structure that a pair of lead wires 17a of the coil 17 wound on the coil bobbin 18 are led out directly to a location above the upper face of the support plate 20. In other words, the lead wires 17a must be led out from one of the fitting windows 21 of the support plate 20. Accordingly, it is a problem that, when the lead wires 17a are led out to a location above the upper face of the support plate 20, they may be contacted with and may readily be cut or damaged by an inner edge 21a of the fitting window 21 of the support plate 20. It is also a problem that, since a spacing through which the lead wires 17a are to be led out from the fitting window 21 is restricted by a flange 18a of the coil bobbin 18, the operability in such leading out of the lead wires 17a is low. Besides, where the magnetic head is incorporated in a flexible disk drive unit not shown, the lead wires 17a may readily be contacted with the inner edge 21a of the fitting window 21 by vibrations or the like of the drive unit. Accordingly, also in such an instance, there is the possibility that the lead wires 17a may be cut or damaged. In addition, such problems may appear also when lead wires of the erasing coil 16 are to be led out.

SUMMARY OF THE INVENTION

Accordingly, it is an object of the present invention to provide a magnetic head for a flexible disk which prevents lead wires from being cut or damaged by contact thereof with an edge of a fitting window of a gimbal spring when they are to be led out and facilitates such a drawing operation and a connecting operation of lead wires.

In order to attain the object, according to the present invention, there is provided a magnetic head for a flexible disk which includes a slider, a magnetic core securely mounted on the slider, a coil bobbin mounted on the magnetic core and having a coil wound thereon, and a support plate for supporting the slider thereon, and wherein lead wires of the coil are lead out to a location on or above an upper face of the support plate, comprising a terminal locating table formed on a flange of the coil bobbin which is located at an end of the coil bobbin adjacent the support plate, and a number of terminals corresponding to the lead wires of the coil provided uprightly on the terminal locating table and having ends of the corresponding lead wires secured thereto, the terminals extending upwardly through and above the upper face of the support plate.

With the magnetic head for a flexible disk of the present invention, the lead wires of the coil are led out by means of the terminals of the coil bobbin which extend upwardly above the upper face of the support plate only by securely attaching end portions of the lead wires to the terminals provided uprightly on the terminal locating table which is projected uprightly from the flange of the coil bobbin. Thus, since the lead wires are led out by means of the terminals without contacting with an edge of a fitting window of the support plate, an operation of leading out the lead wires is made unnecessary and accordingly possible cutting of or damage to the lead wires upon such leading out can be prevented. Further, since electric connection between the lead wires and the printed circuit board is established only by connecting the termianls to the printed circuit board, a connecting operation can be made readily and with certainty.

The above and other objects, features and advantages of the present invention will become apparent from the following description and the appended claims, taken in conjunction with the accompanying drawings.

DETAILED DESCRIPTION OF THE PREFERRED EMBODIMENT

Figure 8:
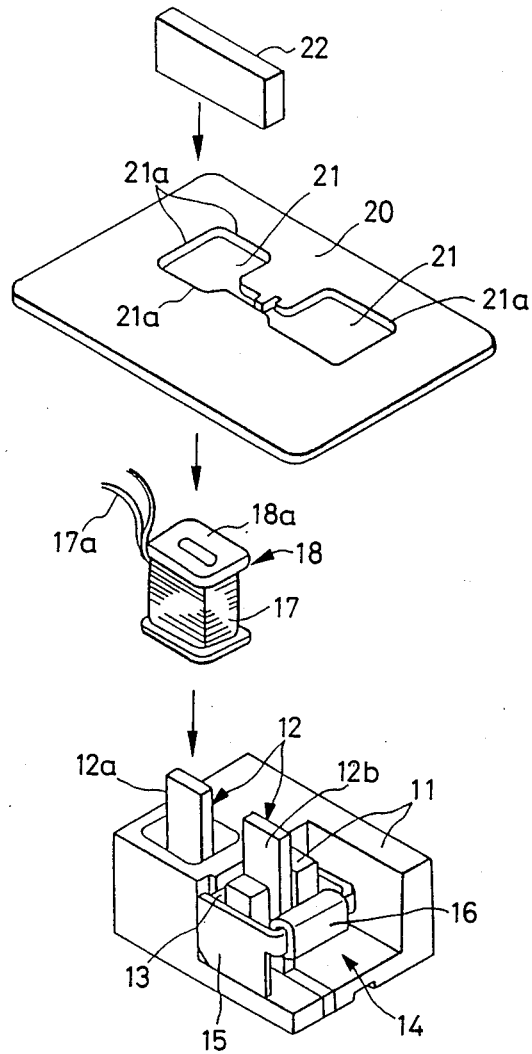
FIG. 8 is a fragmentary perspective view of a conventional magnetic head for a flexible disk.
Figure 9:
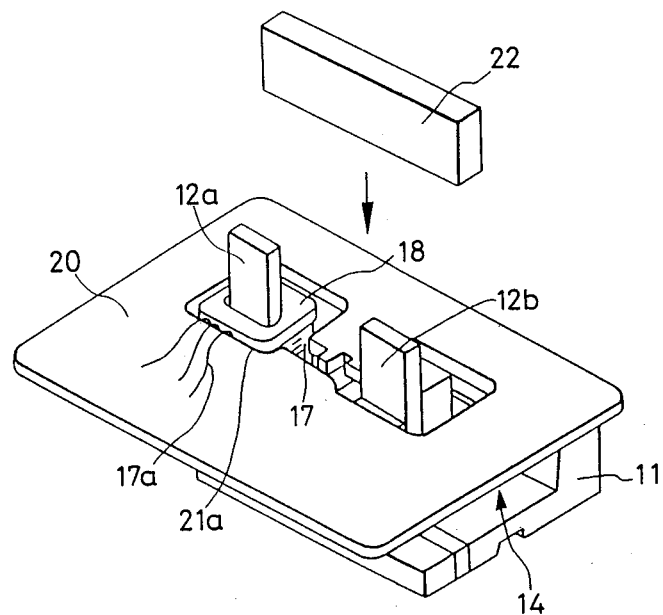
FIG. 9 is a perspective view of the magnetic head of FIG. 8 is an assembled condition.

Referring first to FIGS. 1 to 4, there is shown a magnetic head for a flexible disk embodying the present invention. It is to be noted that like parts or elements are denoted by like reference numerals to those of FIGS. 8 and 9 in which the conventional magnetic head for a flexible disk described hereinabove is shown.

The magnetic head generally denoted at 30 includes a magnetic core of the complex type wherein a pair of recording and playback side cores 32 and a pair of erasing side cores 33 are joined together with a non-magnetic material 31 interposed therebetween. The complex magnetic core is held from opposite sides thereof by and between a slider 11 (see FIG. 2). A non-magnetic material such as glass is interposed in an air gap between the pair of recording and playback side cores 32 and also in an air gap between the pair of erasing side cores 33 to form a recording and playback gap 34 and an erasing gap 35, respectively. The slider 11 thus holds the complex magnetic core from the opposite sides in order to secure the latter in position.

Figure 1:
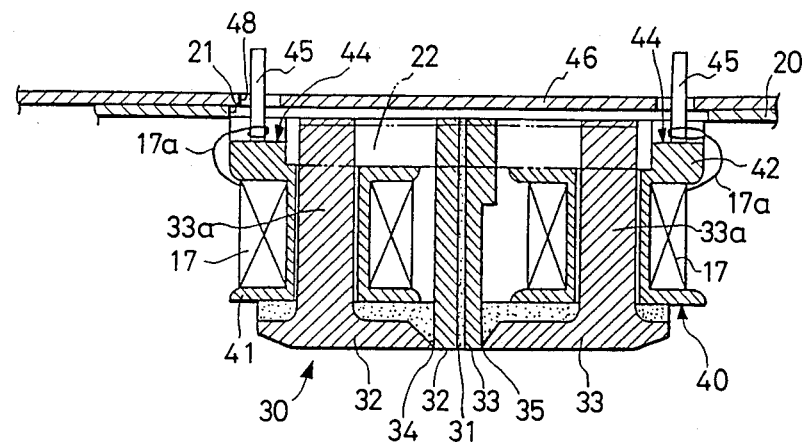
FIG. 1 is a sectional view taken along line I—I of FIG. 2 showing an embodiment of magnetic head for a flexible disk according to the present invention.
Figure 2:
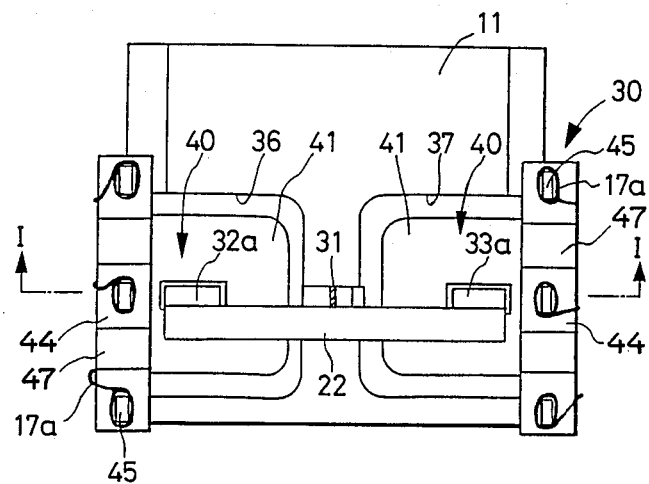
FIG. 2 is a top plan view of the magnetic head of FIG. 1 with a support plate and a flexible circuit board removed.
Figure 3:
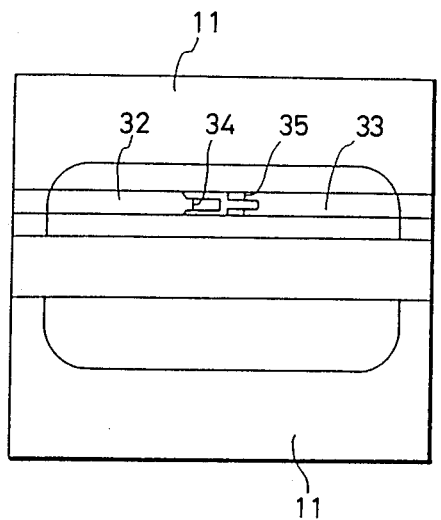
FIG. 3 is a side elevational view of the magnetic head of FIG. 1.
Figure 4:
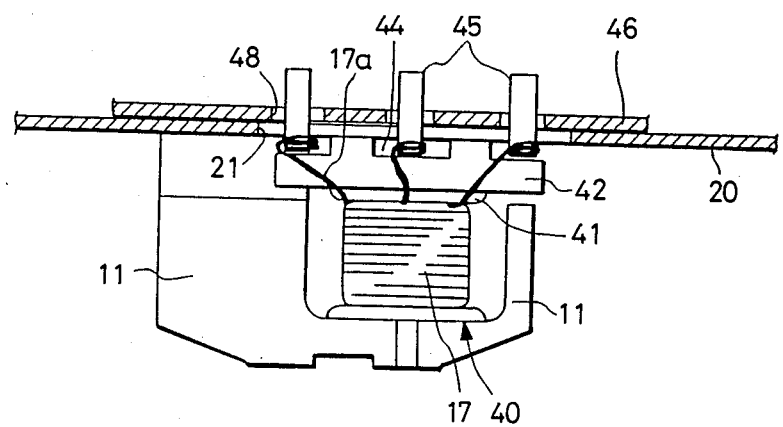
FIG. 4 is a bottom plan view of the magnetic head of FIG. 1.

A pair of recesses 36 and 37 are formed on the slider 11 as shown in FIG. 2. The recesses 36 and 37 provide accommodating spacings for a pair of coil bobbins 40, and leg portions 32a and 33a of the recording and playback side cores 32 and the erasing side cores 33 are projected into the recesses 36 and 37, respectively. A back core 22 is joined to and extends between upwardly projected portions of the leg portions 32a and 33a of the recording and playback side core 32 and the erasing side core 33.

Figure 5:
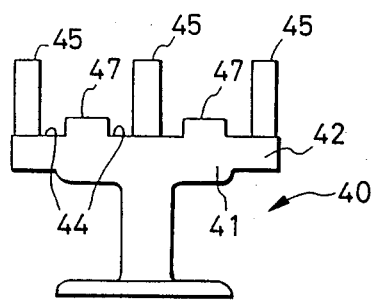
FIG. 5 is a front elevational view of a coil bobbin incorporated in the magnetic device of FIG. 1.
Figure 6:
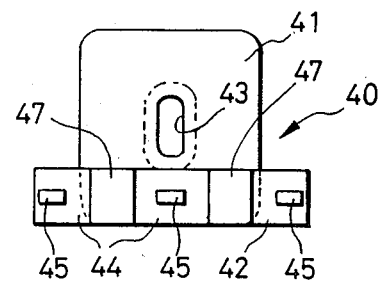
FIG. 6 is a top plan view of the coil bobbin of FIG. 5.
Figure 7:
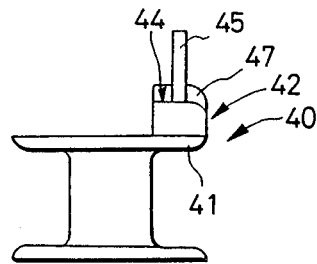
FIG. 7 is a side elevational view of the coil bobbin of FIG. 5.

Referring now to FIGS. 5 to 7, each of the coil bobbins 40 to be mounted on the leg portions 32a and 33a (see FIG. 2) of the recording and playback side core 32 (see FIG. 1) and the erasing side core 33 and accommodated in the recesses 36 and 37 of the slider 11 has a pair of flanges at opposite ends thereof. That one of the flanges which is located on the entrance side of the recesses 36 and 37, that is, the flange denoted at 41, has an upwardly projected terminal locating table 42 (see FIG. 5) thereon. In particular, the terminal locating table 42 is formed on the flange 41 which extends perpendicularly to the direction of the length of a mounting hole 43 (see FIG. 6) formed in the bobbin 40 and is located such that where the coil bobbin 40 is mounted on the leg portion 32a or 33a (see FIG. 6) of the recording and playback side core 32 or the erasing side core 33, it may be positioned at an end portion of the complex magnetic core. A plurality of recesses 44 (see FIG. 5) are formed on an upper face of the terminal locating table 42, and a terminal 45 is provided uprightly on each of the recesses 44. The recesses 44 are formed so as to provide spacings in which ends of the lead wires 17a (see FIG. 1) are to be secured to the terminals 45, and correspond in number to the lead wires 17a. The terminals 45 to which the lead wires 17a are securely connected are connected to a printed circuit board 46 (see FIG. 5) secured to an elastic support plate 20 and extend upwardly through the fitting holes 21 to and above the top face of the support plate 20. A pair of projections 47 are formed on the terminal locating table 42 for contacting with the bottom face of the support plate 20.

With the construction described above, by mounting the coil bobbins 40 onto the leg portions 32a and 33a (see FIG. 2) of the complex magnetic core such that the terminal locating tables 42 of the coil bobbins 40 may be located adjacent the opposite ends of the complex magnetic core, the coil bobbins 40 are accommodated in and assembled to the recesses 36 and 37 of the slider 11. After then, end portions of the lead wires 17a of the coils 17 are wound around base portions of the terminals 45 of the coil bobbins 40 and secured to the coil bobbins 40 by soldering or the like. Consequently, electric connection is established between the coils 17 and the terminals 45, which eliminates the necessity of leading out the lead wires 17a to a location above the support plate 20. Subsequently, the back core 22 is joined together to the leg portions 32a and 33a of the complex magnetic core. Such joint is made by a suitable means such as a spring clip or a bonding agent. Finally, the support plate 20 is secured to the slider 11 and then the printed circuit board 46 is secured to the support plate 20 (see FIG. 4). Consequently, the terminals 45 are projected upwardly above the upper face of the base plate 46 through the fitting windows 21 of the support plate 20 and corresponding holes 48 formed in the printed circuit board 46. Then, the terminals 45 are connected to printed wires on the printed circuit board 46 thereby to establish electric connection between the coils 17 and the printed circuit board 46. Thus, according to the present invention, there is no necessity of leading out the lead wires 17a to a location above the support plate 20 through the fitting windows 21 of the support plate 20. Accordingly, the lead wires 17a will not contact with the inner edge 21 of any of the fitting windows 21, which will prevent damage to or cutting of the lead wires 17a. Further, the lead wires 45 securely mounted on the terminals 45 are prevented from contacting with the support plate 20 by the receses 44 of the coil bobbins. Besides, since the lead wires 17a are led out by the terminals 45 which are projected above the upper face of the support plate 20, connection thereof to the printed circuit board 46 is facilitated and made sure, which improves the operability. In addition, if the working accuracy of the terminals 45 is promoted, the fitting windows 21 of the support plate 20 can be reduced comparing with those of a conventional support plate.

Having now fully described the invention, it will be apparent to one of ordinary skill in the art that many changes and modifications can be made thereto without departing from the spirit and scope of the invention as set forth herein.

What is claimed is:

1. A magnetic head for a flexible disk which includes a slider, a magnetic core securely mounted on said slider, a coil bobbin mounted on said magnetic core and having a coil wound thereon, and a support plate for supporting said slider thereon, and wherein lead wires of said coil are lead out to a location on or above an upper face of said support plate, comprising a flange of said coil bobbin which is located at an end of said coil bobbin adjacent said support plate, and a number of terminals corresponding to said lead wires of said coil provided uprightly on said flange and having ends of the corresponding lead wires secured thereto, said terminals extending upwardly through and above said upper face of said support plate; wherein said flange includes projections defining one recess for each terminal, a base portion of each terminal being located in said one recess.

2. A magnetic head for a flexible disk according to claim 1, wherein end portions of said lead wires of said coil are wound around and secured to the base portions of the corresponding terminals.

3. A magnetic head for a flexible disk according to claim 1, wherein a projection is provided between each adjacent ones of the recesses of said flange for contacting a lower face of said support plate.

4. A magnetic head for a flexible disk according to claim 1, wherein said terminals are connected directly to a printed circuit board mounted on said support plate.

5. A magnetic head comprising:
   a magnetic core; and
   a coil bobbin mounted on said magnetic core and having a coil wound thereon, wherein the coil bobbin includes a flange formed on one end of the coil bobbin, the flange having projecting portions defining at least two recesses and also having at least two terminals provided projecting from the flange, each terminal having a lower portion thereof located in one of the recesses, wherein lead wires from the coil are wound around the lower portion only of the terminals.

* * * * *